Patented Feb. 23, 1926.

1,574,165

UNITED STATES PATENT OFFICE.

DAVID D. PEEBLES, OF EUREKA, CALIFORNIA.

MILK PRODUCT AND THE PROCESS OF MAKING THE SAME.

No Drawing. Application filed December 24, 1923. Serial No. 682,585.

*To all whom it may concern:*

Be it known that I, DAVID D. PEEBLES, a citizen of the United States, and a resident of Eureka, county of Humbolt, State of California, have invented a new and useful Milk Product and the Process of Making the Same, of which the following is a specification.

The invention relates to a semi-solid milk product and the process of making the same.

An object of the invention is to produce a fresh milk product in semi-solid form.

Another object of the invention is to produce a fresh milk product in semi-solid form which has substantially the same keeping qualities as butter.

Another object of the invention is to produce a fresh milk product in semi-solid form which contains substantially all of the solids contained in whole fresh milk.

Another object of the invention is to provide a process of making a fresh milk product in semi-solid form containing substantially all of the solids contained in fresh milk in the form in which they are contained in the milk.

The invention possesses other advantageous features, some of which, with the foregoing, will be set forth at length in the following description, where I shall outline in full the product of my invention and the process of making the same. In this description I shall outline the preferred form of product and process, but it is to be understood that I do not limit myself to such form, since the invention, as set forth in the claims, may be embodied in a plurality of forms.

In accordance with my invention I produce a semi-solid milk product which contains substantially all of the solids contained in whole milk in the form in which they are contained in the milk. In making the product I do not introduce any materials or adulterants for the purpose of producing the semi-solid condition of the product, so that the final product comprises pure condensed whole fresh milk. Milk, and by this expression, I mean cow's milk, consists of water, fat solids and non-fat solids. The fat solids and the non-fat solids are contained in milk in various proportions and I have found that the condensing properties of milk are determined largely by the relative proportions of fat and non-fat solids. The non-fat solids are usually contained in larger proportions than the fat solids and I have found that by reducing the proportion of non-fat solids to substantial equality with the fat solids that the milk may readily be condensed to semi-solid form and that in such form it possesses keeping qualities substantially the same as butter. The condensation of the milk is effected without oxidizing the fat solids so that the finished product has substantially the same taste as whole milk.

The fat solids in whole fresh milk are in the form of fine globules dispersed throughout the milk and in the finished product of my invention the fat solids are still in the form of fine globules. The product of my invention is clearly distinguishable from butter since in the making of butter the fat globules are broken down and form the continuous medium in which the water present in the butter is dispersed. Butter contains a very small proportion of the non-fat solids originally contained in the fresh milk, whereas the products of my invention contain substantially all of the non-fat solids contained in the fresh milk. These non-fat solids are extremely important from a dietetic standpoint and by retaining them in the product of my invention I have produced a product having greater dietetic value than butter.

As far as I am aware it has not been practical heretofore to concentrate unadulterated whole milk to semi-solid form without oxidizing the fat solids, thus rendering the product unpalatable. Unadulterated whole milk has heretofore not been concentrated to semi-solid form to produce a product having keeping qualities. Adulterants, such as sugar have been mixed with the milk prior to its condensation to permit the production of a thick concentrated product but a semi-solid product having keeping qualities has not heretofore been produced.

In accordance with my invention I treat whole milk so that the proportions of fat solids and non-fat solids therein are substantially equal. Whole milk ordinarily contains an excess of non-fat solids over the fat solids and the desired proportion may be produced by adding fat solids to the whole milk or by removing non-fat solids therefrom. I prefer to use this latter method and reduce the proportion of non-fat solids by removing a portion of the skim milk from the whole milk. This may be readily accomplished by passing a portion of the milk through a separator and discarding the skim milk until the desired proportion of fat and non-fat solids are produced. I prefer that the amount of fat solids be slightly in excess of the amount of non-fat solids. The preferable proportions being ten and five tenths parts fat solids to ten parts non-fat solids.

The fresh milk, with the fat and non-fat solids in substantially equal proportions, is then pasteurized and condensed by heat and evaporation to a condition of substantially eighty percent total solids at which time the material is in semi-solid form. When desired the milk may be pasteurized in vacuum to produce a sterile product but I have found that the finished product produced by pasteurizing the milk in the ordinary manner has substantially the same keeping qualities as butter. After the condensation has been carried out to the desired extent, the product is cooled and packaged.

The product thus produced contains approximately eighty percent total solids and twenty percent water. These solids are preferably present in the proportion of approximately fifty percent fats to fifty percent non-fats although this proportion may be varied to some extent without interfering with the quality of the product. The proportion of the non-fats may vary from forty to sixty percent and the proportion of the fats may vary from sixty to forty percent.

The product of my invention is particularly useful in the manufacture of ice-cream. Many States have laws which set forth the amount and proportions of fats and non-fats which must be present in the ice-cream. The material of my invention contains fat solids and non-fat solids in definite proportions, which may be varied at the time of manufacture to suit the requirements of various State laws, to make the material particularly useful in the manufacture of ice-cream. The product thus provides the required amounts and proportions of the total fat and non-fat solids content of ice-cream and all that it is necessary for the ice-cream manufacturer to do is to mix his sugar, gelatine, water and other materials with the requisite amounts of the product of my invention, to produce ice-cream which will meet all of the requirements of the law. It is to be understood however, that the material has many uses, other than in the manufacture of ice-cream and may be used in place of butter as a spread. The material has substantially the same flavor as whole fresh milk, since it contains practically all of the fat solids and non-fat solids of fresh milk and, due to this fact has dietetic and nutritive values in excess of butter.

I claim:

1. A new article of manufacture comprising condensed unadulterated whole fresh milk in semi-solid form in which the fat solids and non-fat solids are present in substantially equal proportions.

2. A new article of manufacture comprising condensed fresh milk in semi-solid form in which the fat solids and the non-fat solids are present in substantially equal proportions, the fat solids being in the form of fine globules dispersed in the mass.

3. A new article of manufacture comprising condensed fresh milk containing approximately eighty percent solids, the said solids being of from 40% to 60% fat and from 60% to 40% non-fat.

4. A new article of manufacture comprising condensed fresh milk containing approximately 40% fat solids, 40% non-fat solids and 20% water.

5. A new article of manufacture comprising a semi-solid material containing approximately 40% milk fat solids and 40% milk non-fat solids and having substantially the same keeping qualities as butter.

6. A new article of manufacture comprising a semi-solid material containing approximately 40% milk fat solids in the form of fine globules disseminated throughout the material and approximately 40% milk non-fat solids.

7. A new article of manufacture comprising condensed fresh milk in semi-solid form containing approximately 80% solids, said solids being of from 40% to 60% fat and from 60% to 40% non-fat and having substantially the same keeping qualities as butter.

8. A new article of manufacture comprising a semi-solid material containing approximately 80% of milk solids and 20% water, said solids being of from 40% to 60% unoxidized fats and from 60% to 40% non-fats, the fats being in the form of fine globules disseminated throughout the material and the material having substantially the same keeping qualities as butter.

9. The method of making a semi-solid product from whole fresh milk which comprises removing a portion of the non-fat solids from the whole milk to produce a product in which the fats and non-fats are in substantially equal proportion, and condensing the product thus formed to a semi-solid mass containing approximately 20% water.

10. The method of making a semi-solid product from whole fresh milk which comprises removing a portion of the non-fats solids from the whole milk to produce a product in which the fats and non-fats are in equal proportion, pasteurizing the product and condensing the product to approximately 80% total solids content.

11. The method of making a semi-solid product from whole fresh milk which comprises altering the proportions of the non-fats solids and fat solids in the milk, so that these proportions are substantially equal, and condensing the resultant milk to a semi-solid mass.

In testimony whereof, I have hereunto set my hand.

DAVID D. PEEBLES.